United States Patent
Chandran et al.

(10) Patent No.: US 12,395,486 B2
(45) Date of Patent: Aug. 19, 2025

(54) CREDENTIAL GATEWAY STORING DIFFERENT CREDENTIALS ON DIFFERENT SECURE STORAGE TYPES

(71) Applicant: ASSA ABLOY AB, Stockholm (SE)

(72) Inventors: Krishna Kumar Chandran, Chennai (IN); Rameshbabu R. Songukrishnasamy, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 338 days.

(21) Appl. No.: 17/757,518

(22) PCT Filed: Dec. 17, 2020

(86) PCT No.: PCT/EP2020/086841
§ 371 (c)(1),
(2) Date: Jun. 16, 2022

(87) PCT Pub. No.: WO2021/123031
PCT Pub. Date: Jun. 24, 2021

(65) Prior Publication Data
US 2023/0015030 A1    Jan. 19, 2023

(30) Foreign Application Priority Data
Dec. 17, 2019  (IN) .............. 201941052449

(51) Int. Cl.
*H04L 29/06* (2006.01)
*H04L 9/40* (2022.01)

(52) U.S. Cl.
CPC .......... *H04L 63/0853* (2013.01); *H04L 63/20* (2013.01)

(58) Field of Classification Search
CPC ..................... H04L 63/0853; H04L 63/20
See application file for complete search history.

(56) References Cited

U.S. PATENT DOCUMENTS

| | | | |
|---|---|---|---|
| 8,984,615 B2 * | 3/2015 | Bhuyan | H04L 63/0884 719/311 |
| 10,356,087 B1 | 7/2019 | Vetter et al. | |

(Continued)

FOREIGN PATENT DOCUMENTS

| | | |
|---|---|---|
| CN | 104412536 | 3/2015 |
| CN | 105378744 | 3/2016 |

(Continued)

OTHER PUBLICATIONS

"International Application Serial No. PCT EP2020 086841, International Preliminary Report on Patentability mailed Jun. 30, 2022", 10 pgs.

"European Application Serial No. 20824055.6, Response Filed Jan. 2, 2023 to Communication pursuant to Rules 161(1) and 162 EPC", 13 pgs.

"Chinese Application Serial No. 202080091192.5, Office Action mailed Jan. 17, 2024", with English translation, 21 pages.

(Continued)

*Primary Examiner* — Jeffrey C Pwu
*Assistant Examiner* — Thong P Truong
(74) *Attorney, Agent, or Firm* — Schwegman Lundberg & Woessner, P.A.

(57) ABSTRACT

Methods and systems are provided for performing operations comprising: receiving, by a credential gateway from a client device, a request to obtain a digital credential for accessing a secure resource, the credential gateway being configured to coordinate an exchange of digital credentials associated with different secure resource types with a plurality of client devices; communicating the request to a server associated with the secure resource; receiving, by the credential gateway from the server associated with the secure resource, a data object that includes the digital credential; selecting, by the credential gateway, based on the data object, a security protocol from a plurality of security protocols; and providing, by the credential gateway, the digital credential to the client device in accordance with the selected security protocol.

19 Claims, 7 Drawing Sheets

(56) References Cited

U.S. PATENT DOCUMENTS

| | | | | |
|---|---|---|---|---|
| 2005/0027706 | A1* | 2/2005 | Bhatti | G06F 16/10 |
| 2010/0263032 | A1* | 10/2010 | Bhuyan | H04L 63/061 |
| | | | | 726/12 |
| 2017/0278103 | A1* | 9/2017 | Cheong | G06Q 20/4014 |
| 2018/0309741 | A1 | 10/2018 | Neafsey et al. | |
| 2019/0213305 | A1 | 7/2019 | Mercury et al. | |

FOREIGN PATENT DOCUMENTS

| | | | | |
|---|---|---|---|---|
| CN | 106233704 | | 12/2016 | |
| CN | 106960314 | | 7/2017 | |
| CN | 114902610 | | 8/2022 | |
| IN | 202217036863 | | 11/2022 | |
| WO | WO-2020117903 | A1 * | 6/2020 | H04L 63/0435 |
| WO | WO-2021123031 | A1 | 6/2021 | |

OTHER PUBLICATIONS

"International Application Serial No. PCT/EP2020/086841, International Search Report mailed Apr. 6, 2021", 5 pgs.

"International Application Serial No. PCT/EP2020/086841, Written Opinion mailed Apr. 6, 2021".

"Chinese Application Serial No. 202080091192.5, Response filed May 17, 2024 to Office Action mailed Jan. 17, 2024", W English Claims, 19 pgs.

"European Application Serial No. 20824055.6, Response filed Feb. 28, 2025 to Communication Pursuant to Article 94(3) EPC mailed Nov. 4, 2024", 78 pgs.

"Indian Application Serial No. 202217036863, First Examination Report mailed Feb. 24, 2025", 6 pgs.

* cited by examiner

CREDENTIAL GATEWAY STORING DIFFERENT CREDENTIALS ON DIFFERENT SECURE STORAGE TYPES

CROSS-REFERENCE TO RELATED APPLICATION

This application is a U.S. National Stage filing under 35 U.S.C. § 371 of PCT Patent Application No. PCT/EP2020/086841, filed on Dec. 17, 2020, which claims the benefit of priority to Indian application Ser. No. 20/194,1052449, filed with the India (IN) Patent Office on Dec. 17, 2019, which are incorporated herein by reference in their entirety.

BACKGROUND

Electronic credentials are increasingly being hosted in smart devices (e.g., smart phones, smart watches, and various other Internet-connected devices) and has become commonplace. Such electronic credentials are used to unlock electronic smart door locks (used in Hotels, Enterprises), present digital identifiers of users (e.g., digital driver's licenses), and to present electronic tickets for entering ticketed events (e.g., concerts, sporting events, and so forth).

SUMMARY

In some aspects, a method is provided comprising: receiving, by a credential gateway from a client device, a request to obtain a digital credential for accessing a secure resource, the credential gateway being configured to coordinate an exchange of digital credentials associated with different secure resource types with a plurality of client devices; communicating the request to a server associated with the secure resource; receiving, by the credential gateway from the server associated with the secure resource, a data object that includes the digital credential; selecting, by the credential gateway, based on the data object, a security protocol from a plurality of security protocols; and providing, by the credential gateway, the digital credential to the client device in accordance with the selected security protocol.

In some aspects, the secure resource is accessed using a physical access digital credential, a logical access digital credential, governmental digital credential, or a ticketing event digital credential.

In some aspects, the method includes at least one of a smart phone, a mobile device, a smart watch, or a smart user device.

In some aspects, the method includes a digital identifier of a user or key information for operating a physical access device.

In some aspects, the method includes: a profile identifier, an interface identifier, and a credential template.

In some aspects, the method includes an embedded secure element (eSE) protocol, a trusted execution environment (TEE) protocol, and a soft storage protocol on smart device volatile memory.

In some aspects, the method includes: determining, by the credential gateway, a manufacturer associated with the client device; exchanging between the credential gateway and the manufacturer, cryptographic keys for accessing a secure element of the client device; and storing system keys associated with the credential gateway on a portion of the secure element using the cryptographic keys of the secure element of the client device.

In some aspects, the method includes providing, by the credential gateway, the digital credential to the client device by: encrypting the data object comprising the digital credential using the system keys; transmitting the encrypted data object to the client device; and causing the client device to store the encrypted data object on the portion of the secure element.

In some aspects, the portion of the secure element comprises a supplementary security domain of the secure element.

In some aspects, the method includes receiving, by the client device, a request to access the digital credential; and retrieving the digital credential by decrypting the encrypted data object using the system keys.

In some aspects, the method includes: receiving, by a credential gateway application implemented on the client device, input from a user to add a new digital credential, wherein the credential gateway application is configured to store multiple digital credentials for different types of secure resources associated with different manufacturers, the credential gateway application being configured to store a first digital credential on a portion of a secure element and configured to store a second digital credential on a trusted execution environment of the client device.

In some aspects, a system is provided that comprises: one or more processors configured to perform operations comprising: receiving, by a credential gateway from a client device, a request to obtain a digital credential for accessing a secure resource, the credential gateway being configured to coordinate an exchange of digital credentials associated with different secure resource types with a plurality of client devices; communicating the request to a server associated with the secure resource; receiving, by the credential gateway from the server associated with the secure resource, a data object that includes the digital credential; selecting, by the credential gateway, based on the data object, a security protocol from a plurality of security protocols; and providing, by the credential gateway, the digital credential to the client device in accordance with the selected security protocol.

In some aspects, the secure resource is accessed using a physical access digital credential, a logical access digital credential, governmental digital credential, or a ticketing event digital credential.

In some aspects, the system includes at least one of a smart phone, a mobile device, a smart watch, or a smart user device.

In some aspects, the system includes a digital identifier of a user or key information for operating a physical access device.

In some aspects, the system includes: a profile identifier, an interface identifier, and a credential template.

In some aspects, the system includes an embedded secure element (eSE) protocol, a trusted execution environment (TEE) protocol, and a soft storage protocol.

In some aspects, a non-transitory computer-readable medium comprising non-transitory computer-readable instructions is provided that includes: receiving, by a credential gateway from a client device, a request to obtain a digital credential for accessing a secure resource, the credential gateway being configured to coordinate an exchange of digital credentials associated with different secure resource types with a plurality of client devices; communicating the request to a server associated with the secure resource; receiving, by the credential gateway from the server associated with the secure resource, a data object that includes the digital credential; selecting, by the credential gateway, based on the data object, a security protocol from a plurality of security protocols; and providing, by the credential gateway, the digital credential to the client device in accordance with the selected security protocol.

DETAILED DESCRIPTION

Figure 1:
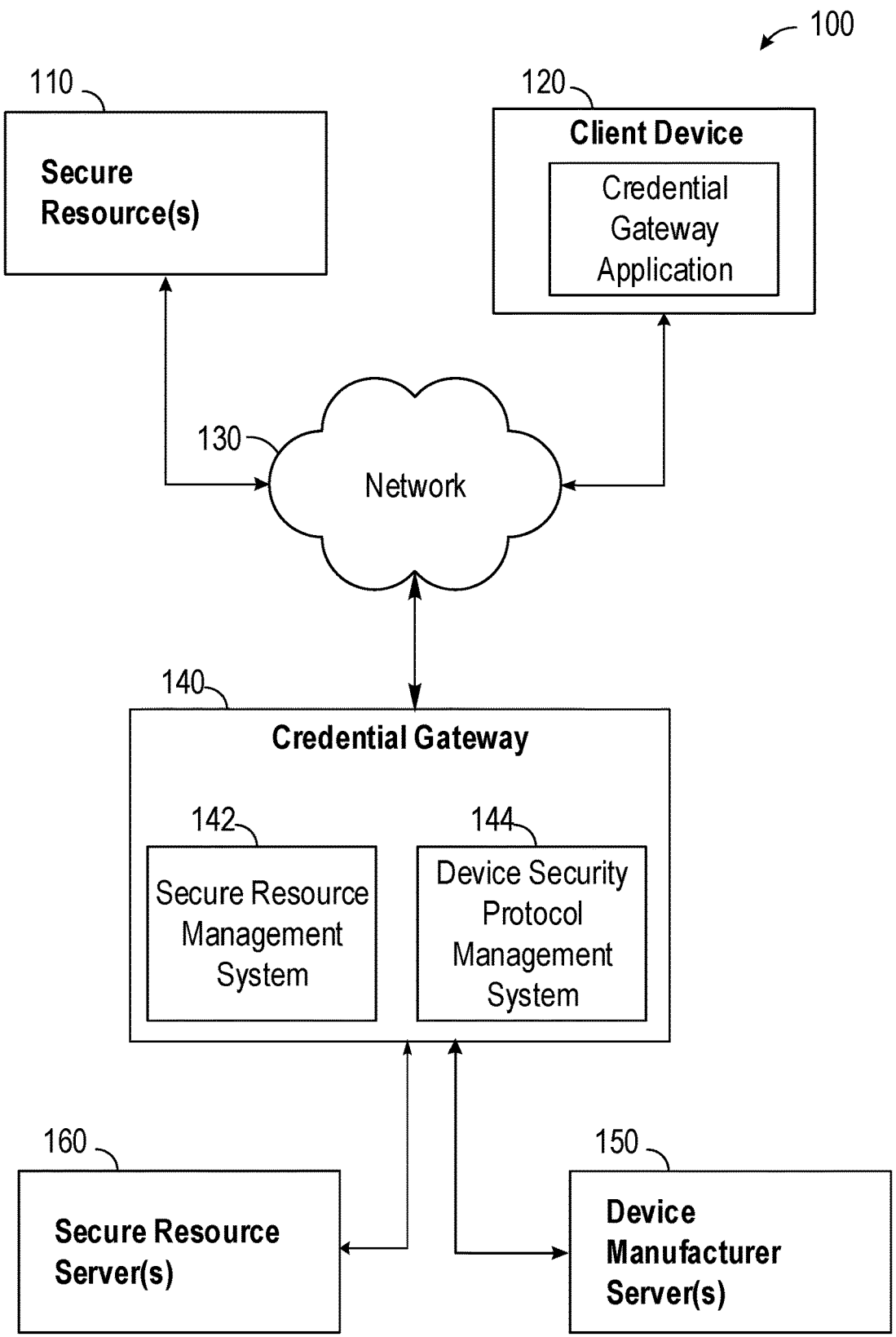
FIG. 1 is a block diagram of an example credential gateway system, according to some embodiments.

Example methods and systems for a credential gateway system are described. In the following description, for purposes of explanation, numerous specific details are set forth in order to provide a thorough understanding of example embodiments. It will be evident, however, to one of ordinary skill in the art that embodiments of the disclosure may be practiced without these specific details.

In typical physical access control systems, a user carries a physical card or device that contains a set of credentials (e.g., authorization information). Such credentials are exchanged with a physical access device (e.g., an electronic door lock) when the physical card or device is brought within about 20 centimeters (close proximity) to the physical access device. At that point, the physical access device determines if the credentials authorize the user to access the physical access device and, if so, the physical access device grants access (e.g., opens the door lock). While such systems generally work well, they require the user to be very close to the physical access device to operate the physical access device. This can introduce various latencies in operating the devices and can be frustrating to users.

As mobile devices become more common place, such mobile devices can be programmed to carry the same set of credentials as the physical cards that are typically used. These mobile devices can communicate with physical access devices over longer distances, such as using a Bluetooth Low Energy (BLE) communication protocol. For example, the mobile devices can transmit and exchange the credentials with a physical access device over a range of up to 100 meters. In such cases, the physical access device can be operated when the user is at a greater distance away from the physical access device than with the use of the physical card or device. This increases the flexibility of accessing various secure resources, such as physical access control devices.

Mobile devices have been replacing smart cards or Personal Identity Cards and are being used as identity wherever applicable. These mobile devices need trust when they perform these transactions using their digital identity on the devices. In the digital world of millions of smart devices and wearables connected to the Internet, the need for digital identity becomes imperative and these identities needs to be safely vetted, delivered and presented to other smart devices in unified manner with a seamless user experience. There are many different credential technologies in the market today. Diverse proprietary technologies and the lack of a universal standard on the credential technology is the primary reason for the digital credential ecosystem's complexity.

A customer system which intends to provide digital identity to end users typically needs to integrate with several credential providers (e.g., lock manufacturers in the case of access control system or system integrators) to support different proprietary credential technologies. A credential provider does not commonly support multiple proprietary credential technologies because each technology varies in protocol specifications, encoding patterns, cryptographic and security schemes. The delivery mechanism of the digital credentials to the end-user device adds another layer of complication to the customer systems and credential providers. This is due to the fact that the delivery to end-user devices varies based on device type, device storage (embedded secure element (eSE) or secure element, device memory, etc.), and data structure and data encoding. Credential providers also need to engage in partnerships with several prime original equipment manufacturers if the credentials are to be delivered to secure element storage or executed in a trusted execution environment in the client device. The lack of any standardization of providing digital credentials to end users limits the range of secure resources that can be accessed electronically and limits the types of devices which can store various digital credentials.

The disclosed embodiments provide an intelligent solution that unifies the delivery of digital credentials to client devices and manages storage of such digital credentials in accordance with specifications of a given secure resource. Specifically, the disclosed embodiments provide a credential gateway that manages the receipt of a given digital credential from a server associated with a secure resource and the delivery of the given digital credential to the client device of the end user. The credential gateway coordinates the security protocol with the device manufacturer to store the digital credential securely on the trusted execution environment (TEE) or secure element of the client device. In this way, the credential supplier does not need to contact or learn how to program different client devices with the digital credentials. This broadens the scope of secure resources that can provide digital credentials to end users and makes a greater number of secure resources available for access digitally and electronically to the end users. The credential gateway can also manage the secure delivery of digital credentials by encrypting the digital credentials that are delivered to the client devices and ensuring that such digital credentials are inaccessible by any entity without authorization of the credential gateway.

In some embodiments, the disclosed embodiments provide systems and methods that provide a unified approach to loading various credentials from various secure resource providers and manufacturers onto a client device, such as a smart device (smart phone, smart watch, or any other Internet-connected device). According to the disclosed embodiments, a credential gateway receives from a client device, a request to obtain a digital credential for accessing a secure resource. The credential gateway can be configured to coordinate an exchange of digital credentials associated with different secure resource types with a plurality of client devices. The credential gateway communicates the request to a server associated with the secure resource and receives from the server associated with the secure resource, a data object that includes the digital credential. The credential gateway selects, based on the data object, a security protocol from a plurality of security protocols and provides the digital credential to the client device in accordance with the selected security protocol.

In this way, the credential gateway system can accept requests from any other external system including a mobile or wearable handset manufacturer's system and issue the digital identity that contains critical personal information, system information, and/or access information. The credential gateway can aggregate different types of digital-IDs and can deliver the digital-IDs to any sort of device (smart phone or wearable) in an interoperable way. The credential gateway accepts the requests to provision the digital identities, it provisions or transmits them securely to the smart device (mobile phones, smart phones, wearables, smart watches, or fitness watches) and also enables a mechanism in the smart device to be safely stored and presented to various secure resources (e.g., Internet-of-Things (IoT) devices, physical access control devices, logical access control devices, governmental entities, and residential smart locks and many other Bluetooth or NFC or UWB based smart devices).

FIG. 1 is a block diagram showing an example credential gateway system 100, according to various example embodiments. The credential gateway system 100 can include a client device 120, one or more secure resource(s) 110 that control access to a protected asset or resource, such as through a lockable door, a credential gateway 140, one or more secure resource server(s) 160, and one or more device manufacturer(s) 150 that are communicatively coupled over a network 130 (e.g., Internet, BLE, ultra-wideband (UWB) communication protocol, telephony network).

UWB is a radio frequency (RF) technique that uses short low power pulses over a wide frequency spectrum. The pulses are on the order of millions of individual pulses per second. The width of the frequency spectrum is generally greater than 500 megahertz or greater than twenty percent of an arithmetic center frequency. UWB can be used for communication, such as by encoding data via time modulation (e.g., pulse-position encoding). Here, symbols are specified by pulses on a subset of time units out of a set of available time units. Other examples of UWB encodings can include amplitude modulation and/or polarity modulation. The wide band transmission tends to be more robust to multipath fading than carrier-based transmission techniques. Further, the lower power of pulses at any given frequency tend to reduce interference with carrier-based communication techniques. UWB can be used in radar operations, providing localization accuracies on the scale of tens of centimeters. Due to the possibly variable absorption and reflection of different frequencies in a pulse, both surface and obstructed (e.g., covered) features of an object can be detected. In some cases, the localization provides an angle of incidence in addition to distance.

The client device 120 and the secure resource(s) 110 can be communicatively coupled via electronic messages (e.g., packets exchanged over the Internet, BLE, UWB, WiFi direct or any other protocol). While FIG. 1 illustrates a single secure resource(s) 110 and a single client device 120, it is understood that a plurality of secure resources 110 and a plurality of client devices 120 can be included in the credential gateway system 100 in other embodiments. As used herein, the term "client device" may refer to any machine that interfaces to a communications network (such as network 130) to exchange credentials with a secure resource(s) 110, the credential gateway 140, another client device 120 or any other component to obtain access to the asset or resource protected by the secure resource(s) 110.

The secure resource(s) 110 can include any one or a combination of an IoT device, physical access control device, logical access control device, governmental entity device, ticketing event device, and residential smart lock device and/or other Bluetooth or NFC or UWB based smart device. The secure resource 110 can protect a secure area and can be configured to receive a digital credential or digital credentials from the client device 120. The secure resource 110 can verify that the received digital credential is authorized to access the secure area and, in response, the secure resource 110 can grant access to the secure area. In some embodiments, the client device 120 communicates the identity of the secure resource 110 and the digital credentials to the credential gateway 140 and/or to the secure resource server 160. The credential gateway 140 and/or to the secure resource server 160 can verify whether the digital credentials are authorized to access the identified secure resource. If so, the credential gateway 140 and/or to the secure resource server 160 instruct the secure resource 110 to grant access to the client device 120 (e.g., by unlocking an electronic door lock). In this case, the digital credentials are passed from the client device 120 to the credential gateway 140 and/or to the secure resource server 160 rather than to the secure resource 110.

In some cases, some or all of the components and functionality of the credential gateway 140 can be included in the client device 120 and/or in the secure resource server(s) 160. A client device 120 may be, but is not limited to, a mobile phone, desktop computer, laptop, portable digital assistant (PDA), smart phone, a wearable device (e.g., a smart watch), tablet, ultrabook, netbook, laptop, multi-processor system, microprocessor-based or programmable consumer electronics, or any other communication device that a user may use to access the network 130.

Figure 2:
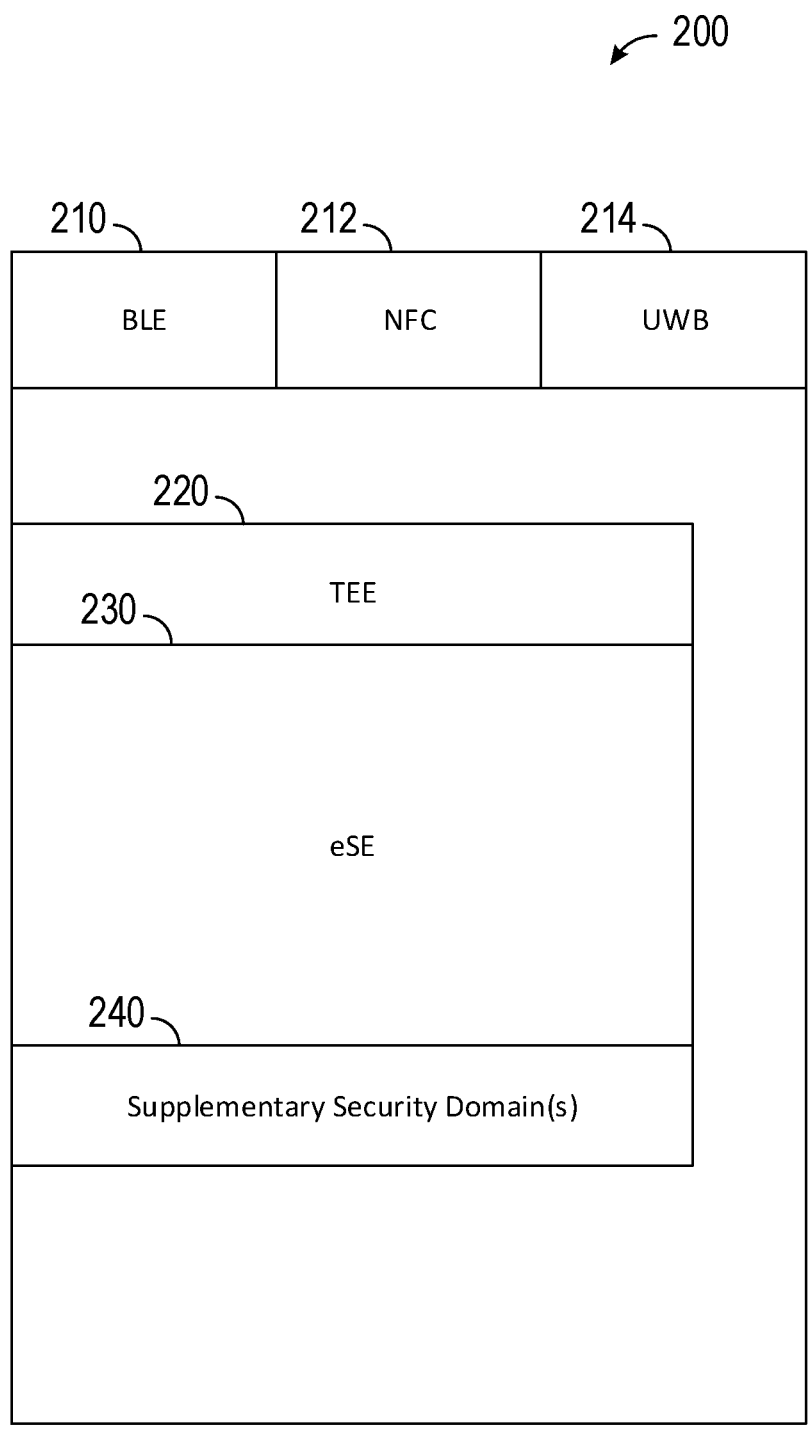
FIG. 2 illustrates an example smart device, according to exemplary embodiments.

FIG. 2 illustrates an example client device 200 (e.g., a smart device), according to exemplary embodiments. The client device 200 can be one implementation of the client device 120 (FIG. 1). The client device 200 may include a plurality of communication interfaces, such as a BLE component 210, an NFC component 212, and a UWB component 214. The BLE component 210 includes one or more communication devices suitable for transmitting and receiving information over a BLE network. The NFC component 212 includes one or more communication devices suitable for transmitting and receiving information over an NFC network. The UWB component 214 includes one or more communication devices suitable for transmitting and receiving information over a UWB network.

Figure 3:
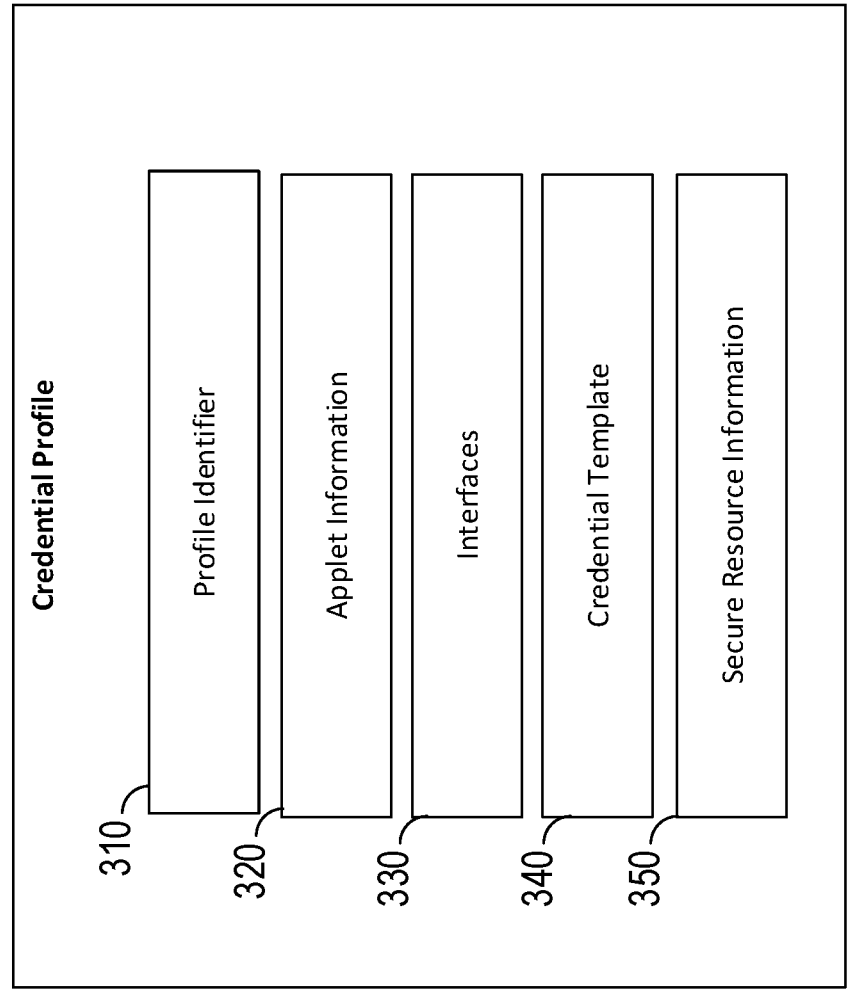
FIG. 3 is a block diagram of an example credential profile that can be deployed within the credential gateway system of FIG. 1, according to some embodiments.

Client device 200 includes standard storage (not shown) that is accessible openly by any application running on the client device 200. The client device 200 also includes secure storage locations, such as a TEE 220, an eSE 230 and a supplementary security domain(s) (SSD) 240. In some cases, a first set of digital credentials and/or credential profiles 300 (FIG. 3) can be stored in the standard storage. A second set of digital credentials and/or credential profiles 300 (FIG. 3) can be stored in the eSE and/or on the supplementary security domain 240. A third set of digital credentials and/or credential profiles 300 (FIG. 3) can be stored in the TEE 220. In some cases, some or all portions of the credential gateway application can be stored and/or executed by the TEE 220 and/or by the supplementary security domain 240.

Referring back to FIG. 1, The secure resource 110 can include a physical access control device that can include an access reader device connected to a physical resource (e.g., a door locking mechanism or backend server) that controls the physical resource (e.g., door locking mechanism). The physical resource associated with the physical access control device can include a door lock, an ignition system for a vehicle, or any other device that grants or denies access to a physical component and that can be operated to grant or deny access to the physical component. For example, in the case of a door lock, the physical access control device can deny access, in which case the door lock remains locked and the door cannot be opened, or can grant access, in which case the door lock becomes unlocked to allow the door to be opened. As another example, in the case of an ignition system, the physical access control device can deny access, in which case the vehicle ignition system remains disabled and the vehicle cannot be started, or can grant access, in which case the vehicle ignition becomes enabled to allow the vehicle to be started.

Physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. The physical access control device forms part of physical access control systems (PACS), which can include a reader (e.g., an online or offline reader) that holds authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server. The host server then determines whether the credentials authorize access to the secure area or secure asset and commands the actuator or other control mechanism accordingly.

In general, the secure resource 110 can include one or more of a memory, a processor, one or more antennas, a communication module, a network interface device, a user interface, and a power source or supply.

The memory of the secure resource 110 can be used in connection with the execution of application programming or instructions by the processor of the secure resource 110, and for the temporary or long-term storage of program instructions or instruction sets and/or credential or authorization data, such as credential data, credential authorization data, or access control data or instructions. For example, the memory can contain executable instructions that are used by the processor to run other components of secure resource 110 and/or to make access determinations based on credential or authorization data. The memory of the secure resource 110 can comprise a computer readable medium that can be any medium that can contain, store, communicate, or transport data, program code, or instructions for use by or in connection with secure resource 110. The computer readable medium can be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), Dynamic RAM (DRAM), any solid-state storage device, in general, a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

The processor of the secure resource 110 can correspond to one or more computer processing devices or resources. For instance, the processor can be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor can be provided as a microprocessor, Central Processing Unit (CPU), or plurality of microprocessors or CPUs that are configured to execute instructions sets stored in an internal memory and/or memory of the physical access control device 110.

The antenna of the secure resource 110 can correspond to one or multiple antennas and can be configured to provide for wireless communications between secure resource 110 and a credential or key device (e.g., client device 120). The antenna can be arranged to operate using one or more wireless communication protocols and operating frequencies including, but not limited to, the IEEE 802.15.1, Bluetooth, Bluetooth Low Energy (BLE), near field communications (NFC), ZigBee, GSM, CDMA, Wi-Fi, RF, UWB, and the like. By way of example, the antenna(s) can be RF antenna(s), and as such, may transmit/receive RF signals through free-space to be received/transferred by a credential or key device having an RF transceiver. In some cases, at least one antenna is an antenna designed or configured for transmitting and/or receiving UWB signals (referred to herein for simplicity as a "UWB antenna") such that the reader can communicate using UWB techniques with the client device 120.

A communication module of the secure resource 110 can be configured to communicate according to any suitable communications protocol with one or more different systems or devices either remote or local to secure resource 110, such as one or more client devices 120 and/or credential gateway 140.

The network interface device of the secure resource 110 includes hardware to facilitate communications with other devices, such as a one or more client devices 120 and/or credential gateway 140, over a communication network, such as network 130, utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, wireless data networks (e.g., IEEE 802.11 family of standards known as Wi-Fi, IEEE 802.16 family of standards known as WiMax), IEEE 802.15.4 family of standards, and peer-to-peer (P2P) networks, among others. In some examples, network interface device can include an Ethernet port or other physical jack, a Wi-Fi card, a Network Interface Card (NIC), a cellular interface (e.g., antenna, filters, and associated circuitry), or the like. In some examples, network interface device can include a plurality of antennas to wirelessly communicate using at least one of single-input multiple-output (SIMO), multiple-input multiple-output (MIMO), or multiple-input single-output (MISO) techniques.

A user interface of the secure resource 110 can include one or more input devices and/or display devices. Examples of suitable user input devices that can be included in the user interface include, without limitation, one or more buttons, a keyboard, a mouse, a touch-sensitive surface, a stylus, a camera, a microphone, etc. Examples of suitable user output devices that can be included in the user interface include, without limitation, one or more LEDs, an LCD panel, a display screen, a touchscreen, one or more lights, a speaker, and so forth. It should be appreciated that the user interface can also include a combined user input and user output device, such as a touch-sensitive display or the like.

The network 130 may include, or operate in conjunction with, an ad hoc network, an intranet, an extranet, a virtual private network (VPN), a LAN, a wireless network, a wireless LAN (WLAN), a wide area network (WAN), a wireless WAN (WWAN), a metropolitan area network (MAN), BLE, UWB, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other short range or long range protocols, or other data transfer technology.

In one example, the client device 120 provides the credentials directly to the secure resource 110. In such cases, the secure resource 110 communicates the credentials to the credential gateway 140. The credential gateway 140 in FIG. 1 includes the secure resource management system 142 and the device security protocol management system 144. The credential gateway 140 can further include elements described with respect to FIGS. 6 and 7, such as a processor and memory, having instructions stored thereon, that when executed by the processor, causes the processor to control the functions of the credential gateway 140.

The credential gateway 140 searches a list of credentials stored in the secure resource management system 142 to determine whether the received credentials match credentials from the list of authorized credentials for accessing a secure asset or resource (e.g., door or secure area) protected by the secure resource 110. In response to determining that the received credentials are authorized to access the secure resource 110, the credential gateway 140 instructs the secure resource 110 to perform an operation granting access for the client device 120 (e.g., instructing the secure resource 110 to unlock a lock of a door).

In another example, the client device 120 provides the credentials to the credential gateway 140. The credential gateway 140 searches a list of credentials stored in the secure resource management system 142 to determine whether the received credentials match credentials from the list of authorized credentials for accessing a secure asset or resource (e.g., door or secure area) protected by the secure resource 110. In response to determining that the received credentials are authorized to access the secure resource 110, the credential gateway 140 instructs the secure resource 110 (associated with the received credentials and within a geographical distance of the client device 120) to perform an operation granting access to the client device 120 (e.g., instructing the physical access control device 110 to unlock a lock of a door).

In some embodiments, the client device 120 implements a credential gateway application. The credential gateway application may run on the client device 120 and can be accessed by a user of the client device 120. The credential gateway application can manage multiple digital credentials that are stored on the client device 120. For example, the credential gateway application can include a digital credentials wallet. The credential gateway application can present a user interface to the user that lists all the digital credentials stored and maintained by the credential gateway application. In response to receiving input from the user that selects a given digital credential from the user interface, the credential gateway application performs operations to retrieve the associated digital credentials. In some cases, the digital credentials are stored in a secure element portion of the client device 120 (e.g., in the supplementary security domain) of the secure element. In some cases, the digital credentials are stored in the TEE of the client device 120. In some cases, the digital credentials are stored in an unsecured memory of the client device 120 in encrypted form.

The credential gateway application determines how the digital credentials are stored on the client device 120 and retrieves and/or decrypts the digital credentials. Upon retrieval and/or decrypting of the digital credentials, the credential gateway application can present the digital credentials on a screen of the client device (e.g., the credential gateway application can display a barcode corresponding to an electronic ticket, a picture of the user associated with the digital credential, such as a digital ID, and so forth). In some cases, the retrieved digital credentials are used to access a secure resource 110. In such circumstances, the credential gateway application transmits the obtained credentials to the secure resource 110 and/or to the credential gateway 140 and/or to the secure resource server 160 to obtain access to the resource protected by the secure resource 110.

The credential gateway application is configured to allow a user to add a new digital credential. For example, the credential gateway application presents an on-screen option to add a new digital credential. In response to receiving selection of the option to add the new digital credential, the credential gateway application obtains identifying information of the secure resource 110 associated with the new digital credential. The credential gateway application transmits the request to add the new digital credential to the credential gateway 140 along with the identifying information of the secure resource 110.

The credential gateway 140 retrieves an identifier of the server associated with the identified secure resource 110 from the secure resource management system 142. Specifically, the credential gateway 140 instructs the secure resource management system 142 to communicate with the secure resource server 160 to obtain the requested new digital credential associated with the secure resource 110 identified by the credential gateway application running on the client device 120. The secure resource management system 142 sends to the secure resource server 160 information associated with the user of the client device 120 and information associated with the secure resource 110 (e.g., a unique address or unique serial number of the secure resource 110).

Figure 4:
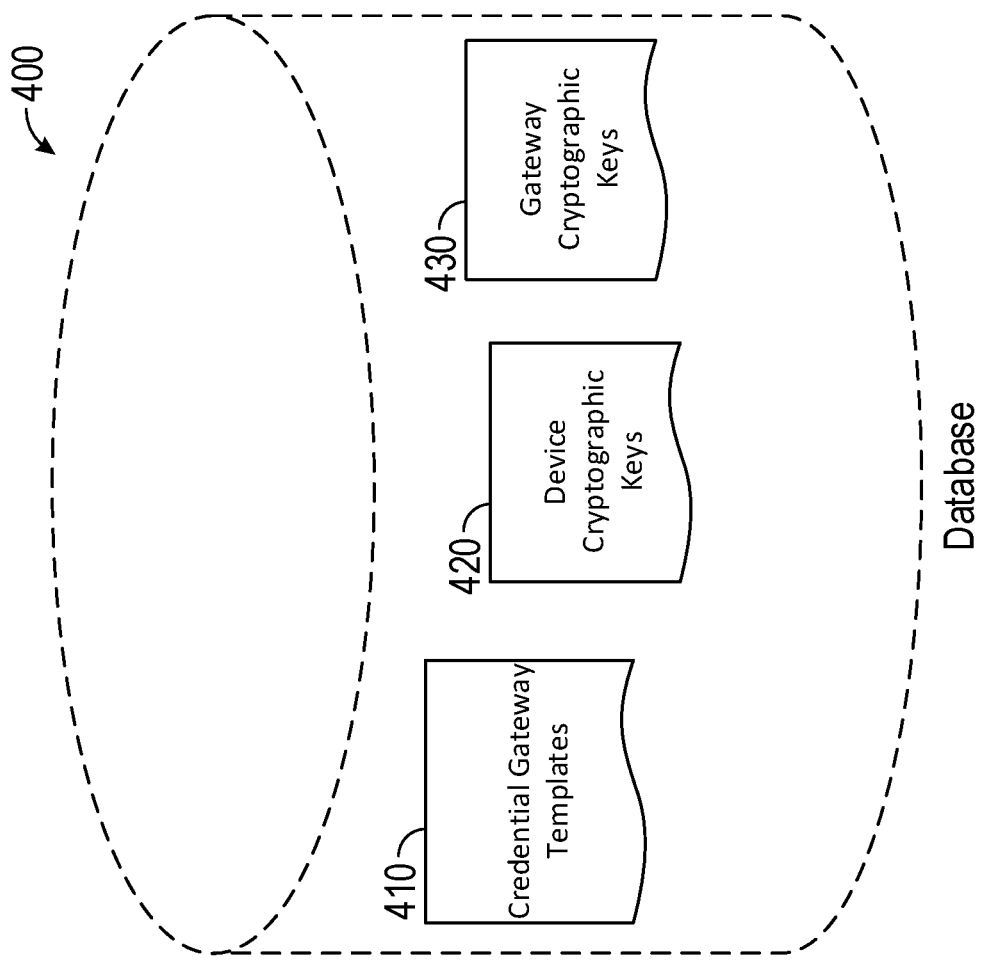
FIG. 4 is an example database that may be deployed within the system of FIG. 1, according to some embodiments.

In some cases, the secure resource management system 142 selects a credential profile 300 (FIG. 3) (or credential profile template) associated with the type of secure resource 110 and provides the selected credential profile 300 to the secure resource server 160. The credential profile template can be selected from the credential gateway templates 410 stored in the database 400 (FIG. 4). Specifically, credential gateway templates 410 can include a plurality of credential profile types. Each of the credential profile types can include a different number and/or type of parameters depending on the secure resource 110 that is associated with the credentials stored in the respective profile.

For example, the secure resource management system 142 can determine that the information that identifies the secure resource 110 indicates that the secure resource is a physical access control device. In such cases, the secure resource management system 142 selects a first type of credential profile 300 (first type of credential profile template) that includes one or more fields that need to be populated by the secure resource server 160 to access and/or communicate with the physical access control device. As another example, the secure resource management system 142 can determine that the information that identifies the secure resource 110 indicates that the secure resource is a ticketing event device that scans electronic tickets. In such cases, the secure resource management system 142 selects a second type of credential profile 300 (second type of credential profile template) that includes one or more fields that need to be populated by the secure resource server 160 to present an electronic ticket to the ticketing event device. As another example, the secure resource management system 142 can determine that the information that identifies the secure resource 110 indicates that the secure resource is a border control device that scans digital IDs (e.g., digital passports). In such cases, the secure resource management system 142 selects a third type of credential profile 300 (third type of credential profile template) that includes one or more fields that need to be populated by the secure resource server 160 to present an electronic passport.

The secure resource server 160 generates a digital credential for accessing the identified secure resource 110. The secure resource server 160 obtains the fields of the credential profile 300 received from the secure resource management system 142. The secure resource server 160 populates the fields of the credential profile 300 based on the digital credential that was generated and various other information (e.g., profile identifier 310, applet information 320, interface information 330, credential template 340, and secure resource information 350). For example, the secure resource management system 142 can include the software type or API information for communicating with the secure resource 110 in the applet information 320. The secure resource server 160 can include the manner of communication with the secure resource 110 (e.g., WiFI, Internet, WiFi direct, BLE, and so forth) in the interface information 330. The secure resource server 160 can store the generated digital credentials in the credential template 340 along with one or more security protocols of the digital credentials. Namely, the secure resource server 160 can specify the level and/or type of security associated with the digital credential (e.g., whether the digital credential needs to be stored in the secure element portion of the client device 120, the TEE of the client device 120, and/or in standard memory in encrypted form on the client device 120). The secure resource server 160 can include any other type of necessary information in the secure resource information 350 (e.g., time limits associated with the digital credential indicating when the digital credential is no longer valid and needs to be deleted, geographic limits indicating a specified location that the client device 120 needs to be in for retrieving the digital credential, and so forth).

In some cases, some portions of the information of the credential profile 300 can be populated by the secure resource management system 142. For example, the secure resource server 160 can provide the information associated with accessing the secure resource 110 in non-standard form. The secure resource management system 142 can then standardize the information by populating the associated credential profile 300.

The secure resource management system 142, upon receiving a data object containing the credential profile 300 (or data associated with the credential profile 300) from the secure resource server 160, determines a security protocol associated with the digital credentials for accessing the secure resource 110. For example, the secure resource management system 142 can process the credential profile 300 to determine the level and/or type of security requested by the secure resource server 160 for storing the digital credentials. The secure resource management system 142 transmits the data object that includes the credential profile 300 to the client device 120 to configure the client device 120 with the new digital credential. The credential gateway application processes the received credential profile 300 and manages storage and retrieval of the digital credential based on the parameters specified in the credential profile 300. The credential gateway application then notifies the user that the digital credential has been received and is ready for use.

The credential gateway application stores the digital credential in association with the profile identifier 310 of the credential profile 300. Namely, upon receiving a user request to access the digital credential, the credential gateway application retrieves the profile identifier 310 of the requested digital credential. The credential gateway application obtains the corresponding credential profile 300 and retrieves the parameters for obtaining the digital credential and communicating or accessing the associated secure resource 110.

For example, the credential gateway application stores the communication protocol associated with the digital credential based on the interfaces information 330 included in the credential profile 300. In this way, when the digital credential is retrieved and accessed, the communication profile associated with the secure resource 110 is used to communicate with the secure resource 110. Specifically, if the communication protocol is BLE, the credential gateway application can activate a BLE component 210 of the client device 120 and transmit the digital credential to the corresponding secure resource 110 over the BLE network. In another implementation, if the communication protocol is NFC, the credential gateway application can activate an NFC component 212 of the client device 120 and transmit the digital credential to the corresponding secure resource 110 over the NFC network. In another implementation, if the communication protocol is UWB, the credential gateway application can activate a UWB component 214 of the client device 120 and transmit the digital credential to the corresponding secure resource 110 over the UWB network.

As another example, the credential gateway application determines whether any time or geographic limits are associated with the digital credential based on the information stored in the secure resource information 350. The credential gateway application verifies that the current time and/or geographic location does not violate any restrictions specified in the credentials profile. As another example, the credential gateway application determines how the digital credentials are stored on the client device 120 (e.g., on the secure element, on the TEE, or in encrypted form on standard memory of the client device 120) based on the information stored in the credential template 340. The credential gateway application then retrieves the digital credential from the storage based on where and how it is stored.

In one implementation, the secure resource management system 142 determines that the specified security protocol corresponds to storing the digital credentials on a supplementary security domain 240 (FIG. 2) of the client device 120. In such cases, the secure resource management system 142 instructs the device security protocol management system 144 to obtain access to the supplementary security domain 240 from the device manufacturer server 150, as discussed below. In some cases, access to the supplementary security domain 240 may be obtained when the credential gateway application is initially installed and setup which avoids having to obtain such access each time a new digital credential is added to the client device 120. In such circumstances, the secure resource management system 142 transmits the data object that includes the credential profile 300 to the client device 120. The credential gateway application processes the credential profile 300 and determines that the digital credential needs to be stored in the supplementary security domain 240. In response, the credential gateway application accesses the supplementary security domain 240 and stores the digital credential in the supplementary security domain 240.

In order to obtain access to the supplementary security domain 240, the device security protocol management system 144 first determines the type of client device 120 on which the credential gateway application is installed. The device security protocol management system 144 then identifies a device manufacturer server 150 associated with the type of client device 120. The device security protocol management system 144 obtains a serial number or other unique identifier of the client device 120 from the credential gateway application. The device security protocol management system 144 communicates the serial number or other unique identifier of the client device 120 to the identified device manufacturer server 150 to obtain a set of cryptographic keys for accessing the secure element of the client device 120. The device security protocol management system 144 stores the received cryptographic keys in the device cryptographic keys 420 of the database 400. In one example, the device cryptographic keys 420 associates each device identifier or serial number with the corresponding set of cryptographic keys received from the device manufacturer server 150.

In one example, the device security protocol management system 144 provides a set of cryptographic keys associated with the client device 120 and receives cryptographic keys from the device manufacturer server 150 for accessing the supplementary security domain 240. The device security protocol management system 144 provides the received cryptographic keys to the credential gateway application. The credential gateway application then uses the received keys to obtain access to the supplementary security domain 240. The device security protocol management system 144 also provides a set of credential gateway keys to the credential gateway application. The credential gateway keys can be retrieved from the gateway cryptographic keys 430 stored in database 400. In some cases, the device security protocol management system 144 maintains the credential gateway keys as a diversified version of the cryptographic key information. The credential gateway application then stores the set of credential gateway keys on the supplementary security domain 240. When the credential gateway application determines that a credential profile 300 includes a digital credential that needs to be stored in the supplementary security domain 240, the credential gateway application obtains the credential gateway keys from the supplementary security domain 240 and encrypts the received digital credential using the credential gateway keys and stores the encrypted digital credential on the supplementary security domain 240. Retrieving the digital credential from the supplementary security domain 240 can be performed in a similar manner in which the digital credential is accessed from the supplementary security domain 240 using the cryptographic keys of the secure element and then decrypted using the credential gateway keys stored in the supplementary security domain 240.

In another implementation, the secure resource management system 142 determines that the specified security protocol corresponds to storing the digital credentials on a TEE 220 (FIG. 2) of the client device 120. In such cases, the secure resource management system 142 instructs the device security protocol management system 144 to obtain access to the TEE 220 from the device manufacturer server 150. In some cases, access to the TEE 220 may be obtained when the credential gateway application is initially installed and setup which avoids having to obtain such access each time a new digital credential is added to the client device 120. In such circumstances, the secure resource management system 142 transmits the data object that includes the credential profile 300 to the client device 120. The credential gateway application processes the credential profile 300 and determines that the digital credential needs to be stored in the TEE 220. In response, the credential gateway application accesses the TEE 220 and stores the digital credential in the TEE 220.

In order to obtain access to the TEE 220, the device security protocol management system 144 first determines the type of client device 120 on which the credential gateway application is installed. The device security protocol management system 144 then identifies a device manufacturer server 150 associated with the type of client device 120. The device security protocol management system 144 obtains a serial number or other unique identifier of the client device 120 from the credential gateway application. The device security protocol management system 144 communicates the serial number or other unique identifier of the client device 120 to the identified device manufacturer server 150 to obtain a set of cryptographic keys for accessing the TEE 220 of the client device 120. The device security protocol management system 144 stores the received cryptographic keys in the device cryptographic keys 420 of the database 400. In one example, the device cryptographic keys 420 associates each device identifier or serial number with the corresponding set of cryptographic keys received from the device manufacturer server 150. In one example, the device security protocol management system 144 provides a set of cryptographic keys associated with the client device 120 and receives cryptographic keys from the device manufacturer server 150 for accessing the TEE 220. The device security protocol management system 144 provides the received cryptographic keys to the credential gateway application. The credential gateway application then uses the received keys to obtain access to the TEE 220. The credential gateway application then stores the digital credential on the TEE 220.

Retrieving the digital credential from the TEE 220 can be performed in a similar manner in which the digital credential is accessed from the TEE 220 using the cryptographic keys of the TEE 220.

In another implementation, the secure resource management system 142 determines that the specified security protocol corresponds to storing the digital credentials in encrypted form on a standard memory of the client device 120. In such cases, the secure resource management system 142 obtains a set of credential gateway keys from gateway cryptographic keys 430 and encrypts the credential profile and/or the digital credential using the credential gateway keys. The secure resource management system 142 can provide the credential gateway keys to the credential gateway application. The credential gateway application stores the received digital credential in encrypted form and/or encrypts the received digital credential using the credential gateway keys. Retrieving the digital credential can be performed in a similar manner in which the digital credential is accessed from the standard memory and decrypted using the credential gateway keys.

Figure 5:
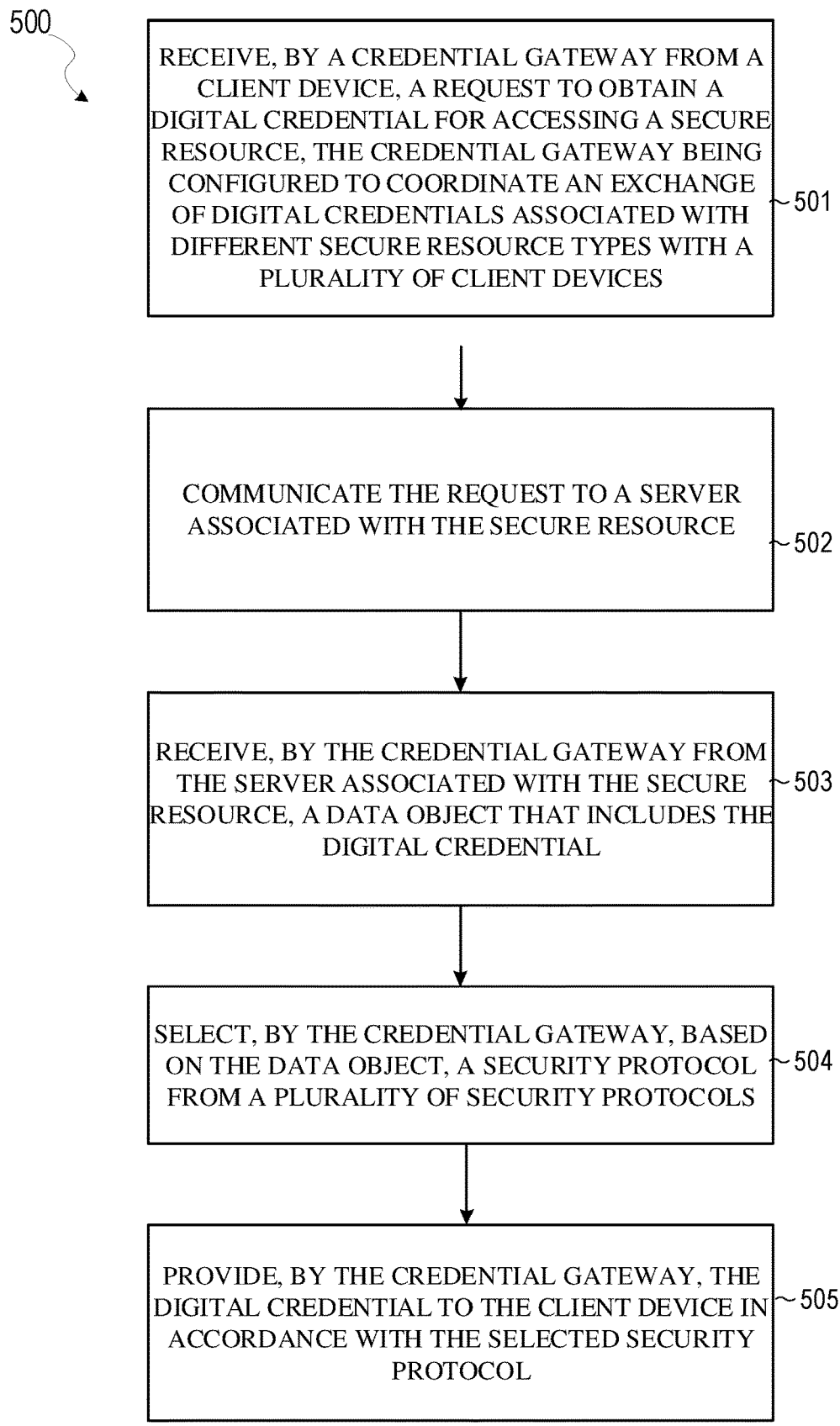
FIG. 5 is a flowchart illustrating example operations of the credential gateway system, according to example embodiments.

FIG. 5 is a flowchart illustrating example process 500 of the credential gateway system 100, according to example embodiments. The process 500 may be embodied in computer-readable instructions for execution by one or more processors such that the operations of the process 500 may be performed in part or in whole by the functional components of the credential gateway system 100; accordingly, the process 500 is described below by way of example with reference thereto. However, in other embodiments, at least some of the operations of the process 500 may be deployed on various other hardware configurations. Some or all of the operations of process 500 can be in parallel, out of order, or entirely omitted.

At operation 501, the credential gateway 140 receives a request to obtain a digital credential for accessing a secure resource, the credential gateway being configured to coordinate an exchange of digital credentials associated with different secure resource types with a plurality of client devices. For example, the credential gateway 140 can receive a request from a credential gateway application on a client device 120 to add a new digital credential to the credential gateway application for accessing a secure resource 110.

At operation 502, the credential gateway 140 communicates the request to a server associated with the secure resource. For example, the credential gateway 140 identifies the secure resource server 160 associated with the secure resource identified by the credential gateway application and requests that the secure resource server 160 generate or provide the digital credential for accessing the secure resource 110.

At operation 503, the credential gateway 140 receives from the server associated with the secure resource a data object that includes the digital credential. For example, the credential gateway 140 receives a credential profile 300 (FIG. 3) that is populated by the secure resource server 160 with various information including the digital credential for accessing the identified secure resource 110.

At operation 504, the credential gateway 140 selects, based on the data object, a security protocol from a plurality of security protocols. For example, the credential gateway 140 processes the credential profile 300 to determine that the digital credential needs to be stored in the supplementary security domain 240 of the client device 120.

At operation 505, the credential gateway 140 provides the digital credential to the client device in accordance with the selected security protocol. For example, the credential gateway 140 provides to the credential gateway application the digital credential and/or the credential profile 300. The credential gateway application processes the received digital credential and/or the credential profile 300 to store the digital credential according to the security protocol specified in the credential profile (e.g., in the standard memory in encrypted form, in the TEE 220 of the client device 120, and/or in the eSE or supplementary security domain 240 of the client device 120).

Figure 6:
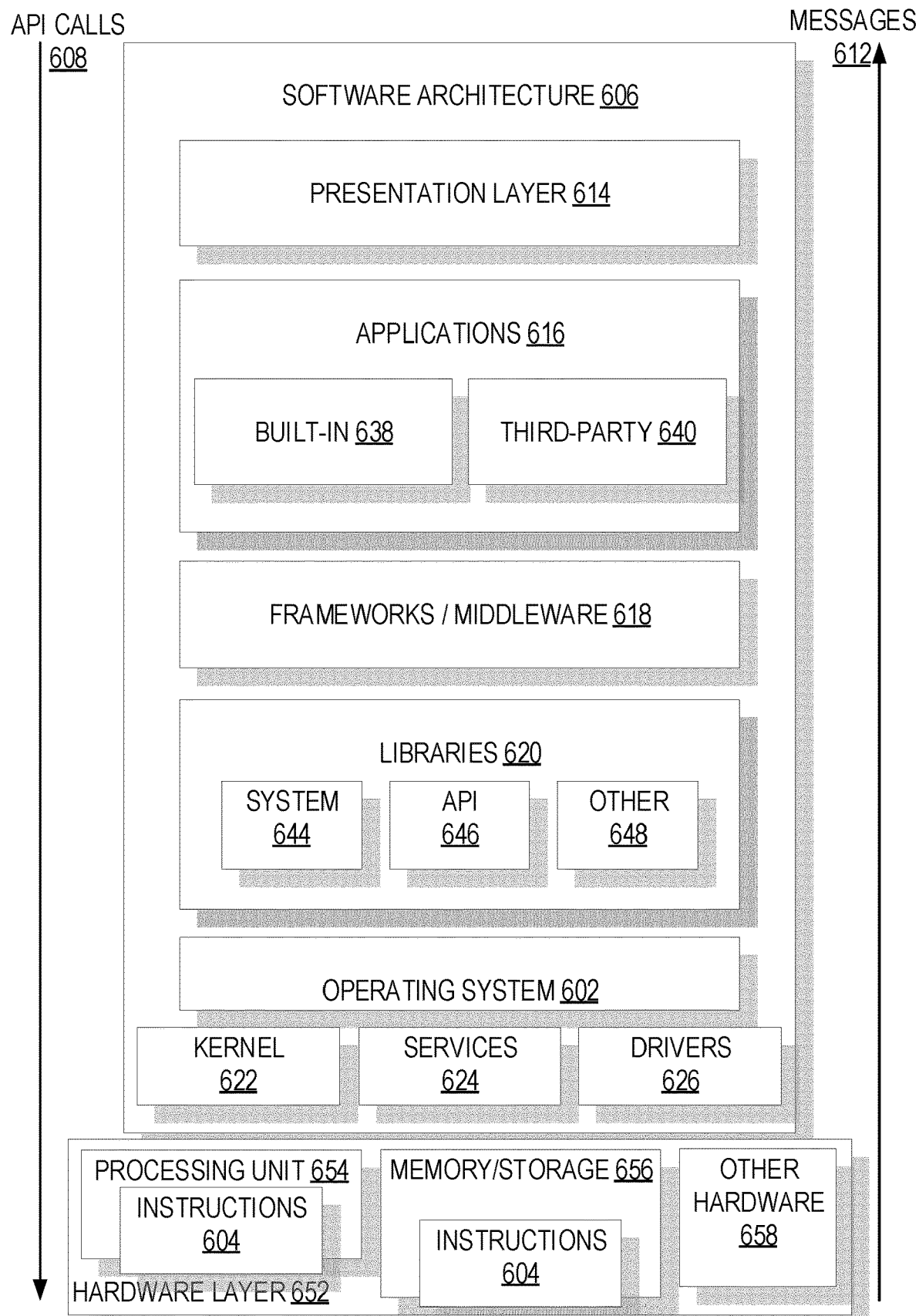
FIG. 6 is a block diagram illustrating an example software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and input/output (I/O) components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage devices memory/storage 656, which also have executable instructions 604. The hardware layer 652 may also comprise other hardware 658. The software architecture 606 may be deployed in any one or more of the components shown in FIG. 1.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, BLE drivers, UWB drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/devices.

The frameworks/middleware 618 (also sometimes referred to as middleware) provide a higher-level common infrastructure that may be used by the applications 616 and/or other software components/devices. For example, the frameworks/middleware 618 may provide various graphic user interface functions, high-level resource management, high-level location services, and so forth. The frameworks/middleware 618 may provide a broad spectrum of other APIs that may be utilized by the applications 616 and/or other software components/devices, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
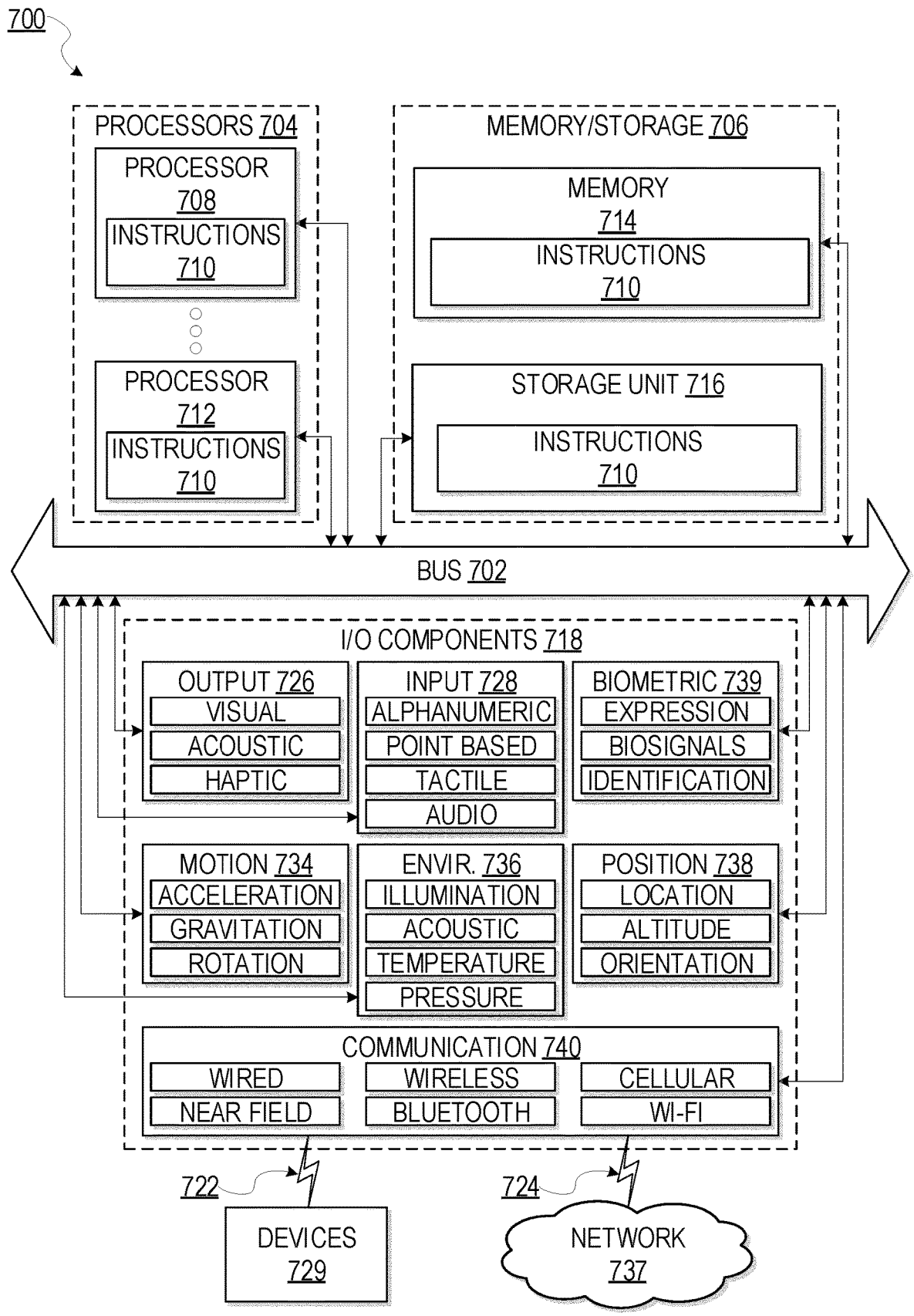
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed.

As such, the instructions 710 may be used to implement devices or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a STB, a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. In an example embodiment, the processors 704 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 708 and a processor 712 that may execute the instructions 710. The term "processor" is intended to include multi-core processors 704 that may comprise two or more independent processors (sometimes referred to as "cores") that may execute instructions contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory/storage 706 may include a memory 714, such as a main memory, or other memory storage, instructions 710, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700.

Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a LED display, a LCD, a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 739, motion components 734, environmental components 736, or position components 738 among a wide array of other components. For example, the biometric components 739 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 737 or devices 729 via coupling 724 and coupling 722, respectively. For example, the communication components 740 may include a network interface component or other suitable device to interface with the network 737. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 729 may be another machine or any of a wide variety of peripheral devices (e.g., a peripheral device coupled via a USB).

Moreover, the communication components 740 may detect identifiers or include components operable to detect identifiers. For example, the communication components 740 may include RFID tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting an NFC beacon signal that may indicate a particular location, and so forth.

Glossary:

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultrabook, netbook, laptop, multi-processor system, microprocessor-based or programmable consumer electronics, game console, set-top box, or any other communication device that a user may use to access a network.

"COMMUNICATIONS NETWORK" in this context refers to one or more portions of a network that may be an ad hoc network, an intranet, an extranet, a VPN, a LAN, a BLE network, a UWB network, a WLAN, a WAN, a WWAN, a metropolitan area network (MAN), the Internet, a portion of the Internet, a portion of the PSTN, a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device, or other tangible media able to store instructions and data temporarily or permanently and may include, but is not limited to, RAM, ROM, buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a FPGA or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

What is claimed is:

1. A method comprising:
  receiving, by a credential gateway from a client device, a request to obtain a digital credential for accessing a secure resource, the credential gateway being configured to coordinate an exchange of digital credentials associated with different secure resource types with a plurality of client devices;
  communicating the request to a server associated with the secure resource;
  receiving, by the credential gateway from the server associated with the secure resource, a data object that includes the digital credential, the data object specifying on which of a first physical type of secure storage comprising a first physical device of the client device and a second physical type of secure storage comprising a second physical device of the client device to store the digital credential;
  selecting, by the credential gateway, based on the data object, a security protocol from a plurality of security protocols;
  receiving, by a credential gateway application implemented on the client device, input from a user to add a new digital credential, the credential gateway application being configured to store multiple digital credentials for different types of secure resources associated with different manufacturers; and
  providing, by the credential gateway, the digital credential to the client device in accordance with the selected security protocol, the client device determining whether to store the digital credential in the first physical type of secure storage of the client device or the second physical type of secure storage of the client device based on the data object the credential gateway received from the server associated with the secure resource, the credential gateway application being configured to store a first digital credential on a portion of the first physical type of secure storage and configured to store a second digital credential on the second physical type of secure storage of the client device.

2. The method of claim 1, the first physical type of secure storage comprising an embedded secure element (eSE) and the second physical type of secure storage comprising a trusted execution environment (TEE).

3. The method of claim 1, wherein the different secure resource types comprise physical access devices provided by different manufacturers, and wherein the client device comprises at least one of a smart phone, a mobile device, a smart watch, or a smart user device.

4. The method of claim 1, wherein the digital credential comprises a digital identifier of a user or key information for operating a physical access device.

5. The method of claim 1, wherein the data object includes a credential profile comprising standardized information for providing the digital credentials, the standardized information comprising:
  a profile identifier, an interface identifier, and a credential template.

6. The method of claim 1, wherein the plurality of security protocols comprise an embedded secure element (eSE) protocol, a trusted execution environment (TEE) protocol, and a soft storage protocol.

7. The method of claim 1, wherein the security protocol comprises an embedded secure element (eSE) protocol, further comprising:
  determining, by the credential gateway, a manufacturer associated with the client device;
  exchanging between the credential gateway and the manufacturer, cryptographic keys for accessing a secure element of the client device; and
  storing system keys associated with the credential gateway on a portion of the secure element using the cryptographic keys of the secure element of the client device.

8. The method of claim 7, wherein providing, by the credential gateway, the digital credential to the client device comprises:
  encrypting the data object comprising the digital credential using the system keys;
  transmitting the encrypted data object to the client device; and causing the client device to store the encrypted data object on the portion of the secure element.

9. The method of claim 8, wherein the portion of the secure element comprises a supplementary security domain of the secure element.

10. The method of claim 8, further comprising:
receiving, by the client device, a request to access the digital credential; and
retrieving the digital credential by decrypting the encrypted data object using the system keys.

11. The method of claim 1, further comprising:
configuring, by the credential gateway, the client device to store the digital credentials associated with the different secure resource types on a secure element of the client device, the configuring comprising:
determining, by the credential gateway, a manufacturer associated with the client device;
exchanging between the credential gateway and the manufacturer, cryptographic keys for accessing the secure element of the client device; and
storing system keys associated with the credential gateway on a portion of the secure element using the cryptographic keys of the secure element of the client device, wherein the digital credentials are stored on the client device based on the system keys.

12. The method of claim 1, further comprising:
configuring, by the credential gateway, the client device to store and process the digital credentials associated with the different secure resource types on a trusted execution environment (TEE) of the client device, the configuring comprising:
determining, by the credential gateway, a manufacturer associated with the client device;
exchanging between the credential gateway and the manufacturer, cryptographic keys for operating the TEE of the client device; and
storing system keys associated with the credential gateway on the TEE of the client device using the cryptographic keys, wherein the TEE of the client device processes data objects that contain the digital credentials to provide the digital credentials to a requesting application.

13. The method of claim 1, further comprising:
configuring, by the credential gateway, the client device to store and process the digital credentials associated with the different secure resource types according to a soft storage protocol, the configuring comprising:
receiving, from one or more manufacturers of the different secure resource types, credential profile templates;
transmitting, from the credential gateway to the client device, cryptographic key information, wherein the credential gateway maintains a diversified version of the cryptographic key information;
encrypting the credential profile templates using the cryptographic key information; and
storing the encrypted credential profile templates on the client device, wherein the client device retrieves the digital credentials from the respective credential profile templates by decrypting the credential profile templates based on the cryptographic key information.

14. The method of claim 1, the credential gateway application being configured to store a first digital credential on a portion of a secure element and configured to store a second digital credential on a trusted execution environment of the client device.

15. A system comprising:
one or more processors configured to perform operations comprising:
receiving, by a credential gateway from a client device, a request to obtain a digital credential for accessing a secure resource, the credential gateway being configured to coordinate an exchange of digital credentials associated with different secure resource types with a plurality of client devices;
communicating the request to a server associated with the secure resource;
receiving, by the credential gateway from the server associated with the secure resource, a data object that includes the digital credential, the data object specifying on which of a first physical type of secure storage comprising a first physical device of the client device and a second physical type of secure storage comprising a second physical device of the client device to store the digital credential;
selecting, by the credential gateway, based on the data object, a security protocol from a plurality of security protocols;
receiving, by a credential gateway application implemented on the client device, input from a user to add a new digital credential, the credential gateway application being configured to store multiple digital credentials for different types of secure resources associated with different manufacturers; and
providing, by the credential gateway, the digital credential to the client device in accordance with the selected security protocol, the client device determining whether to store the digital credential in the first physical type of secure storage of the client device or the second physical type of secure storage of the client device based on the data object the credential gateway received from the server associated with the secure resource, the credential gateway application being configured to store a first digital credential on a portion of the first physical type of secure storage and configured to store a second digital credential on the second physical type of secure storage of the client device.

16. The system of claim 15, wherein the operations comprise:
determining, by the credential gateway, a manufacturer associated with the client device;
exchanging between the credential gateway and the manufacturer, one or more keys for accessing a secure storage of the client device; and
storing system keys on a portion of the secure storage using the one or more keys.

17. The system of claim 15, wherein the operations comprise:
determining, by the credential gateway, a manufacturer associated with the client device;
exchanging between the credential gateway and the manufacturer, cryptographic keys for operating secure storage of the client device; and
storing system keys associated with the credential gateway on the secure storage of the client device using the cryptographic keys.

18. The system of claim 15, wherein the plurality of security protocols comprise an embedded secure element (eSE) protocol, a trusted execution environment (TEE) protocol, and a soft storage protocol, a credential gateway application implemented on the client device being configured to store a first digital credential on a portion of a secure element and configured to store a second digital credential on a TEE of the client device.

19. A non-transitory computer-readable medium comprising non-transitory computer-readable instructions that, when executed by one or more processors, configure the one or more processors to perform operations comprising:

receiving, by a credential gateway from a client device, a request to obtain a digital credential for accessing a secure resource, the credential gateway being configured to coordinate an exchange of digital credentials associated with different secure resource types with a plurality of client devices;

communicating the request to a server associated with the secure resource;

receiving, by the credential gateway from the server associated with the secure resource, a data object that includes the digital credential, the data object specifying on which of a first physical type of secure storage comprising a first physical device of the client device and a second physical type of secure storage comprising a second physical device of the client device to store the digital credential;

selecting, by the credential gateway, based on the data object, a security protocol from a plurality of security protocols;

receiving, by a credential gateway application implemented on the client device, input from a user to add a new digital credential, the credential gateway application being configured to store multiple digital credentials for different types of secure resources associated with different manufacturers; and providing, by the credential gateway, the digital credential to the client device in accordance with the selected security protocol, the client device determining whether to store the digital credential in the first physical type of secure storage of the client device or the second physical type of secure storage of the client device based on the data object the credential gateway received from the server associated with the secure resource, the credential gateway application being configured to store a first digital credential on a portion of the first physical type of secure storage and configured to store a second digital credential on the second physical type of secure storage of the client device.

* * * * *